United States Patent

[11] 3,549,820

[72] Inventor Dieter J. H. Knollman
Sea Bright, N.J.

[21] Appl. No. 726,062
[22] Filed May 2, 1968
[45] Patented Dec. 22, 1970
[73] Assignee Bell Telephone Laboratories, Incorporated
Murray Hill, Berkeley Heights, N.J.
a corporation of New York

[54] KEY TELEPHONE STATION CONCENTRATOR
18 Claims, 8 Drawing Figs.

[52] U.S. Cl. .......... 179/99, 179/18, 179/81
[51] Int. Cl. .......... H04m 1/00
[50] Field of Search .......... 179/99, 27CON, 18PdI, 81

[56] References Cited
UNITED STATES PATENTS

| | | | |
|---|---|---|---|
| 2,715,658 | 8/1955 | Dunlap et al. .......... | 179/27(con) |
| 3,385,935 | 5/1968 | Anderson et al. .......... | 179/99 |
| 3,420,961 | 1/1969 | Averill .......... | 179/99X |

*Primary Examiner*—Kathleen H. Claffy
*Assistant Examiner*—William A. Helvestine
*Attorneys*—R. J. Guenther and Kenneth B. Hamlin

ABSTRACT: An electronic station concentrator compatible with present key telephone systems reduces the number of leads to each key telephone station set to a total of eight leads regardless of the number of keys at the station set. Lamp, ringing and A-lead signals, as well as all feature signals, are multiplexed on a duplex time division control channel. Each station set includes a shift register for receiving, storing and sending the signals over the control channel to the concentrator.

INVENTOR
D. J. H. KNOLLMAN
BY D. E. Snedeker
ATTORNEY

KEY TELEPHONE STATION CONCENTRATOR

BACKGROUND OF THE INVENTION

This invention relates to communications systems, and, more particularly, to improvements in intercommunication and key telephone systems. It has for a general object thereof the reduction in cost and simplification of installation, maintenance and rearrangement of such systems.

Key telephone communication systems have evolved to meet the needs of subscribers requiring various special communication features, such as access to more than one telephone line, access to intercommunicating lines for originating or answering calls thereon, holding one line while another is seized for use, visual signals, and the like. The provision of these features has in the past necessitated the connection of large numbers of conductors between the individual key telephone station sets and the system common equipment cabinet. Even though it is usual practice in such systems to multiple as many conductors as possible at various junction points near the station sets, there are still large numbers of connections to be made since each line appearance and feature at each station set typically requires individual attention and connection.

In key telephone systems of the type presently available, as many as 40 or more individual conductors are necessary to provide a standard six-button key station set with its full complement of features. A standard 30-button CALL DIRECTOR* station set may require as many as several hundred individual conductors. Not only do such large numbers of conductors for each station set result in considerable initial connection complexity and cost, they also necessitate considerable time and cost for subsequent changes and rearrangement and for maintenance. The economic burden imposed is significant and, moreover, the necessity for providing for such large numbers of conductors often presents structural difficulties in the placement or concealment of the conductors.

Additionally, it is becoming increasingly apparent that the requirements of many subscribers include service features which have not been provided heretofore. From an economics standpoint and from a convenience standpoint, it is desirable to provide such new service features in key telephone systems without any increase in the number of conductors associated with the individual station sets.

SUMMARY OF THE INVENTION

It is therefore an object of this invention to provide a key telephone system in which the number of conductors extended to each station set is substantially reduced from that presently required, thereby reducing the cost of installation and rearrangement.

It is a further object of this invention to provide a key telephone system in which the number of conductors extended to an individual station set and the connection of the conductors to the set are independent of the number of key pushbuttons or features provided, thereby permitting direct interchange between different station sets such as six-button sets and 30-button CALL DIRECTOR* sets.

Another object of this invention is to provide a key telephone system in which the number of conductors extended between the individual station sets and the system common equipment is substantially reduced without affecting or reducing the service features provided and in which new service features can be provided without any increase in the number of conductors extended to the individual station sets.

These and other objects of the present invention are attained in an illustrative embodiment of a key telephone system utilizing time division multiplexing techniques and electronic concentrator facilities to substantially reduce the number of conductors required to connect the individual station sets to the system common equipment. In particular, each station set in the illustrative embodiment herein requires only eight conductors extended thereto regardless of the number of key pushbuttons or features provided at the set. Moreover, all station sets are connected identically to the system equipment regardless of the number of key pushbuttons or features at the set, thereby further reducing the cost and complexity of installation and rearrangement and permitting direct interchangeability between various size station sets.

In accordance with one aspect of the illustrative embodiment of the invention the connection functions and switching capabilities are removed from the station set and placed in common system equipment, referred to herein as a station concentrator or line connector. Thus, the number of tip and ring pairs extended to each station set is reduced from one pair per line selection key to one pair per station set. The line connection function is performed at the common station concentrator equipment and is remotely controlled by the station set line selection keys.

According to a further aspect of the invention, control signals for lamp and ringer actuation, for line selection, and for the various other service features are transmitted between the individual station sets and the system common equipment via a respective duplex data transmission channel utilizing binary time division multiplexing techniques. This eliminates the individual lamp leads and A-leads usually extended to each lamp and key at a station set. The control signals to be transmitted are periodically sampled and serially transmitted concurrently to each station set over the respective data transmission channels. Memory is provided at each station set and at the concentrator to store the received control signals between sampling periods.

Once a station set is connected initially no further wiring changes need be made between the station set and the common equipment. Relocation and rearrangement changes are made quite simply by changes in a centrally located cross-connection network at the station concentrator equipment. Moreover, since all station sets are connected to the system common equipment in an identical manner, a station set can be moved physically from one location to another by merely unplugging the set and plugging it in at the new location.

Another aspect of the invention relates to the provision of a single shift register at each station to receive and send control signals and also to store the received control signals between sampling periods. The received control signals stored in the shift register effect operation of the lamps and ringer at the station. This eliminates the need for separate memory at the station, thus serving to minimize the additional circuitry required on a per station basis.

If an error occurs in the control signals transmitted from a station to the concentrator equipment, the station may be connected to an unwanted line. Such errors are minimized in accordance with my invention by the advantageous provision of circuitry at each station for encoding the control signals to be transmitted. Decoding circuitry provided at the concentrator equipment detects all single errors, double errors, and bursts of three errors and prevents the connection of the station to unwanted lines when such errors are detected. This error protection feature is particularly important if nonlocking keys are employed at the station since control signals are transmitted to the concentrator only during the period the key is depressed.

BRIEF DESCRIPTION OF THE DRAWING

The above and other objects and features of the invention may be readily apprehended from the following detailed description taken in conjunction with the accompanying drawing in which.

GENERAL DESCRIPTION OF THE INVENTION

Figures 1, 7:
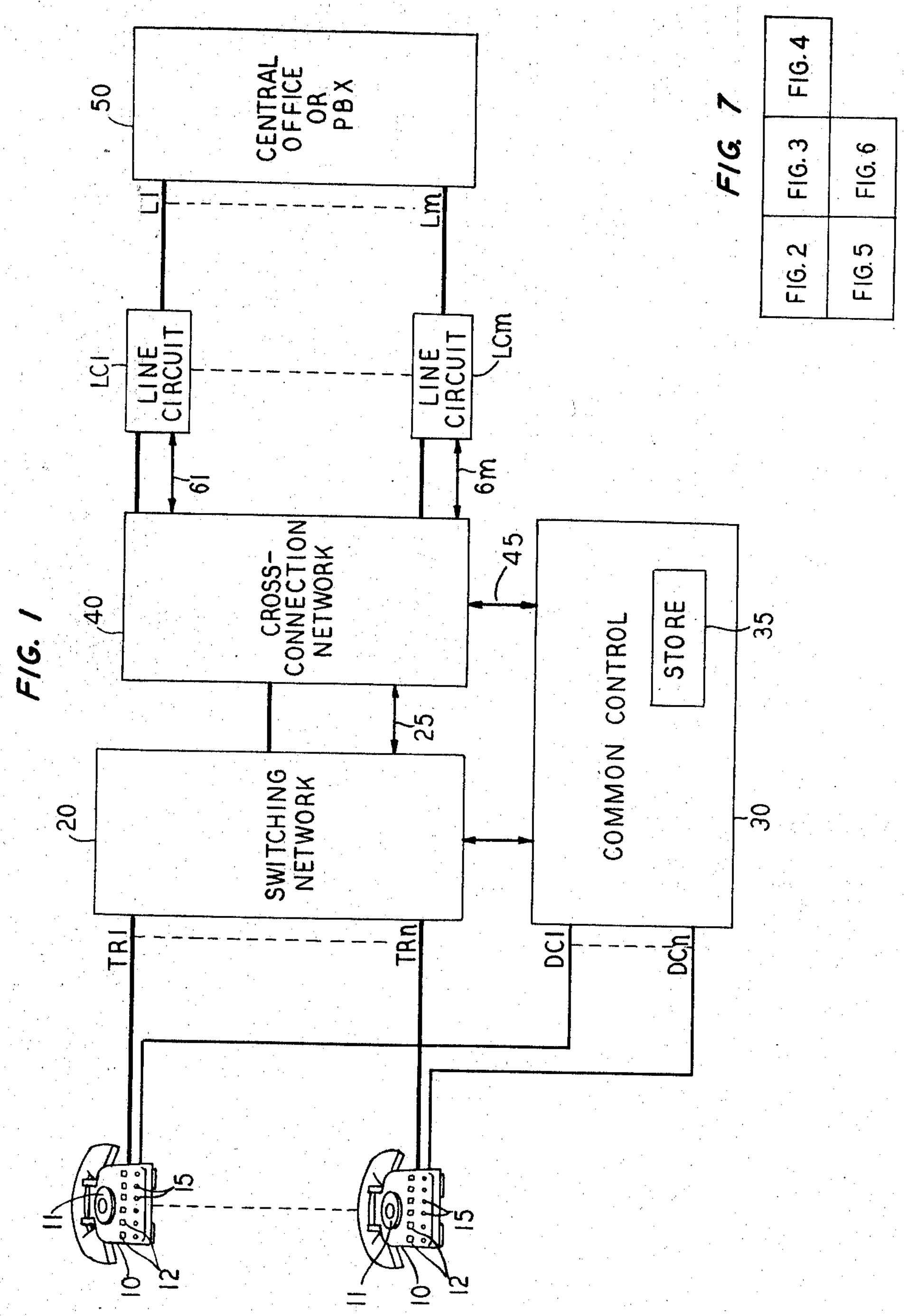
FIG. 1 is a block diagram showing the major functional components included in an illustrative key telephone system embodying the principles of the present invention.

The functional block diagram representation in FIG. 1 of an illustrative key telephone system in accordance with the principles of my invention comprises a plurality of multikey subscriber station sets 10 which are selectively connectable through switching network 20, cross-connection network 40, and a plurality of lines L1 through L*m* to a telephone terminal 50, such as a distant central office or PBX. Each station set 10 is individually connected to switching network 20 via a respective talking path or voice communication channel TR1 through TR*n* and to common control 30 via a respective control signal channel DC1 through DC*n*. It will be noted that the voice channels in FIG. 1, as well as in the remainder of the drawing, are indicated by relatively heavy solid lines to clearly delineate them from the channels or paths provided for supervisory and control signals.

Each station set 10 includes a dialing mechanism, such as rotary dial 11, a set of signaling lamps 15, and a plurality of keys or pushbuttons 12 which are respectively associated with the different service features available at that station set. These features may include, for example, multiple line selection, line hold, line exclusion, or intercom. The signaling lamps 15 may be respectively associated with the individual keys 12, as is well known in the key telephone art, to provide, for example, a flashing signal when an associated line is ringing, a winking signal when the line is on HOLD, and a steady signal when the line is busy. As will be apparent from the description herein, keys 12 may be either locking or nonlocking in accordance with my invention.

Common control 30 includes store 35 for storing station control signals transmitted from station sets 10 over channels DC1 through DC*n*. These station control signals comprise line selection signals, feature signals (such as HOLD, exclusion, intercom signaling and the like), and switch hook information from each station set 10. Thus, store 35 contains the current status of each station set and, via switching network 20, causes connection of the station set voice communication channels through cross-connection network 40 to selected ones of lines L1 through L*m*.

Cross-connection network 40 associates individual ones of keys 12 at station sets 10 with individual ones of lines L1 through L*m* via respective line circuits LC1 through LC*m*. Line circuits LC1 through LC*m* comprise well-known circuitry for performing various control and supervisory functions incident to the establishment of a connection between a common switching point, such as a central office or PBX 50, and one or more station sets at a subscriber's premises. For example, one of the typical functions performed by a telephone line circuit involves detection of a ringing signal from the central office or PBX switching point and, responsive thereto, signaling a particular subscriber station via respective supervisory path 61 through **6*m***. Suitable key telephone line circuits are disclosed and described, for example, in C. E. Morse-J. P. Smith U.S. Pat. No. 3,239,610, issued Mar. 8, 1966, and in R. E. Barbato-D. T. Davis, patent application Ser. No. 535,162 filed Mar. 17, 1966.

In operation, the various station sets 10 in the key telephone system are scanned periodically over control signal channels DC1 through DC*n* to transmit lamp and ringing signals to the station sets and to receive station control signals from the station sets. When an incoming call is received on one of lines L1 through L*m*, it is detected by the corresponding line circuit LC1 through LC*m* which then provides corresponding lamp and ringing signals through cross-connection network 40 over path 45 to common control 30. During the next scan by common control 30, the lamp and ringing signals appearing on path 45 are transmitted over channels DC1 through DC*n* to each of station sets 10 having the called line appearing thereat. When one of these station sets goes off-hook to answer the incoming call and presses the corresponding key 12 to select the called line, a line selection control signal is transmitted by that station set, over the respective one of channels DC1 through DC*n* connected thereto, to common control 30 during the succeeding scan. Common control 30 stores the received control signal from the station set in store 35 and, via switching network 20, effects connection of the answering station set to the called line. Common control 30 also extends the usual ground signal to the called line line circuit through switching network 20 over path 25, indicating that the incoming call has been answered.

The initiation of a call at one of station sets 10 by going off-hook and pressing one of keys 12 effects transmission of a line selection control signal over the respective channel DC1 through DC*n* during the next scan cycle identifying the selected station set key. The control signal is registered in store 35 and causes switching network 20 to connect the station set to the line associated via cross section network 40 with the selected station set key. Common control 30 also extends a ground signal over path 25 to the corresponding line circuit, which is responsive thereto to return a steady lamp signal over path 45 to common control 30. The steady lamp signal is transmitted to the station set initiating the call, causing the lamp 15 associated with the selected station set key 12 to be lit. A steady lamp signal is also transmitted by common control 30 to other ones of station sets 10 to light lamps thereat corresponding to the line appearance selected at the station set initiating the call. From this point the call proceeds in the normal manner, dialing information being transmitted by the station set initiating the call over its voice communication channel, through switching network 20 and cross-connection network 40, over the selected one of lines Ll through L*m* to central office or PBX 50.

Similarly, when a station set goes on-hook, places a line on HOLD, selects another line, or manifests a request for some other service feature available at the station set, a corresponding station control signal is transmitted to common control 30 and stored in store 35. Responsive thereto, common control 30 initiates appropriate action, such as causing switching network 20 to disconnect the station set, connect it to another line, or to a HOLD bridge.

A number of advantages arise from a key telephone system such as shown in FIG. 1. All control and supervisory signals between the individual station sets and the system common equipment are time division multiplexed over respective control signals channels DC1 through DC*n*. This substantially reduces the number of conductors which must be extended to each station set and, further, permits identical connection of all station sets regardless of the different features and regardless of the number of keys provided at the individual sets. Service feature and rearrangement changes are made by changes in the centrally located cross-connection network 40, no changes being necessary therefore in the wiring between the station sets and the common system equipment. New features can be added without extending additional conductors to the station sets. Moreover, station sets can be moved from one location to another by simply unplugging the set, plugging it in at the new location, and making the appropriate cross-connection changes in network 40. A more complete and comprehensive description of a specific illustrative embodiment in accordance with the principles of my invention will be found hereinbelow in the detailed description of the block diagram shown in FIGS. 2 through 6, arranged as indicated in FIG. 7.

DETAILED DESCRIPTION OF THE INVENTION

In FIGS. 2 through 6, portions of an illustrative embodiment of a key telephone system according to my invention are shown in greater detail. Specifically, a multikey station set 101 is shown in detail in FIG. 2 and a portion of the system common equipment, including the station concentrator facilities, is shown in detail in FIGS. 3, 4 and 6. The other station sets in the system, such as station sets 102 and **10*n*, are assumed to be substantially similar to station set 101** except that the number of keys or features provided may vary from set to set. For example, a typical 30-button CALL DIRECTOR* station set is depicted illustratively as station set 102 in FIG. 5.

Figure 2:
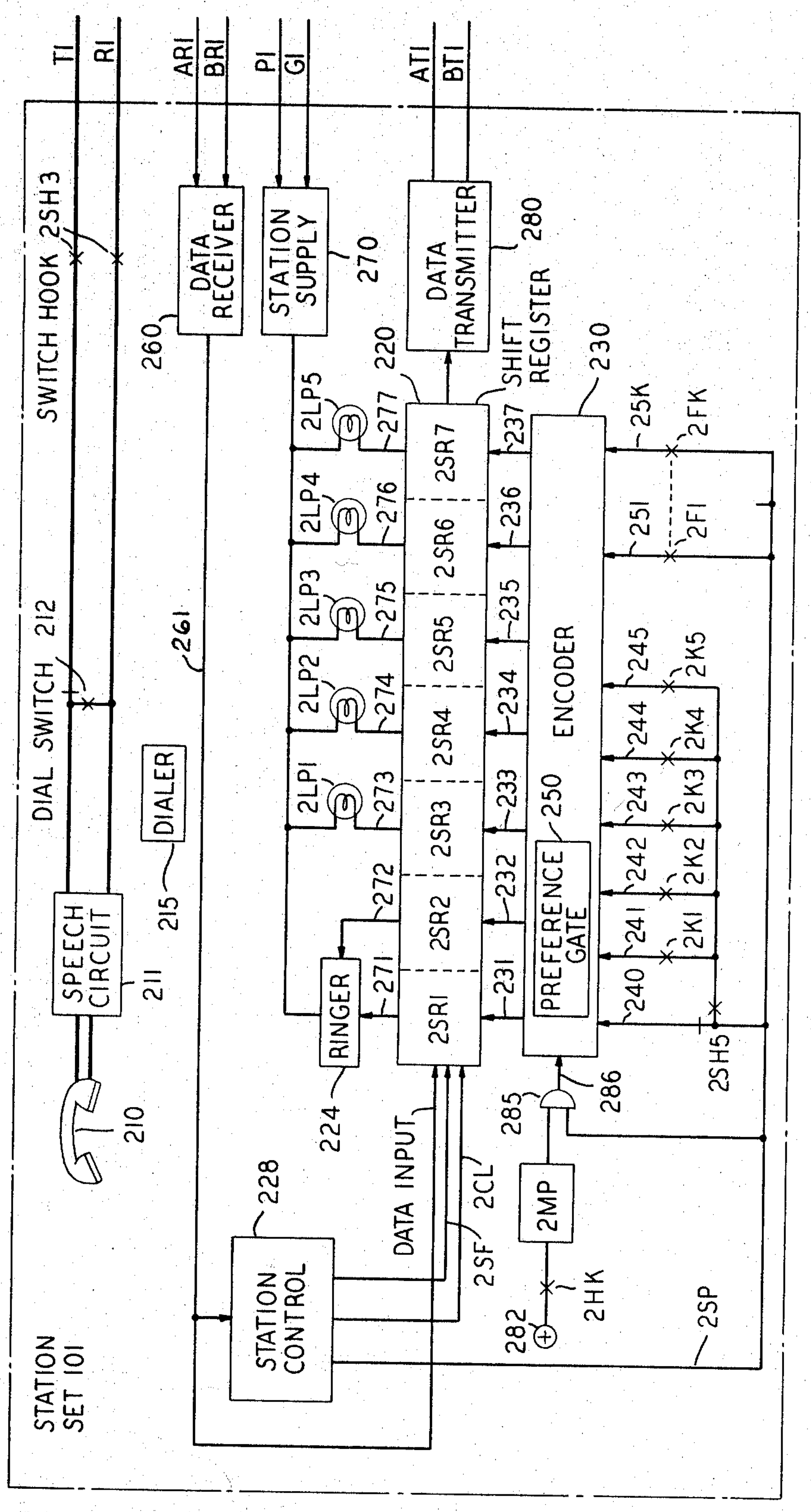
FIGS. 2 through 6, when arranged as indicated in FIG. 7, comprise an additional block diagram of a specific illustrative embodiment of a key telephone system according to my invention showing portions thereof in greater detail.
Figure 3:
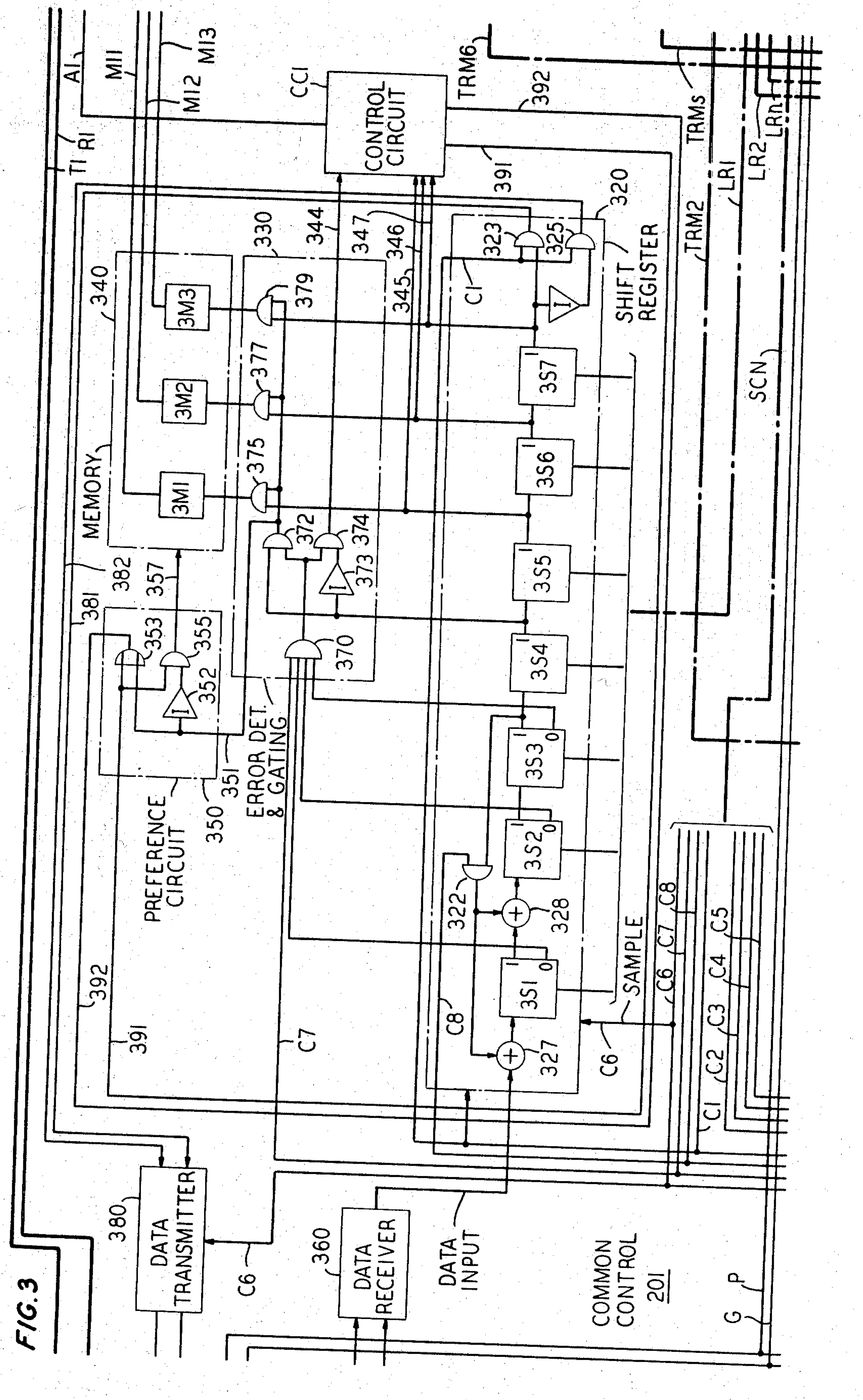
Figure 4:
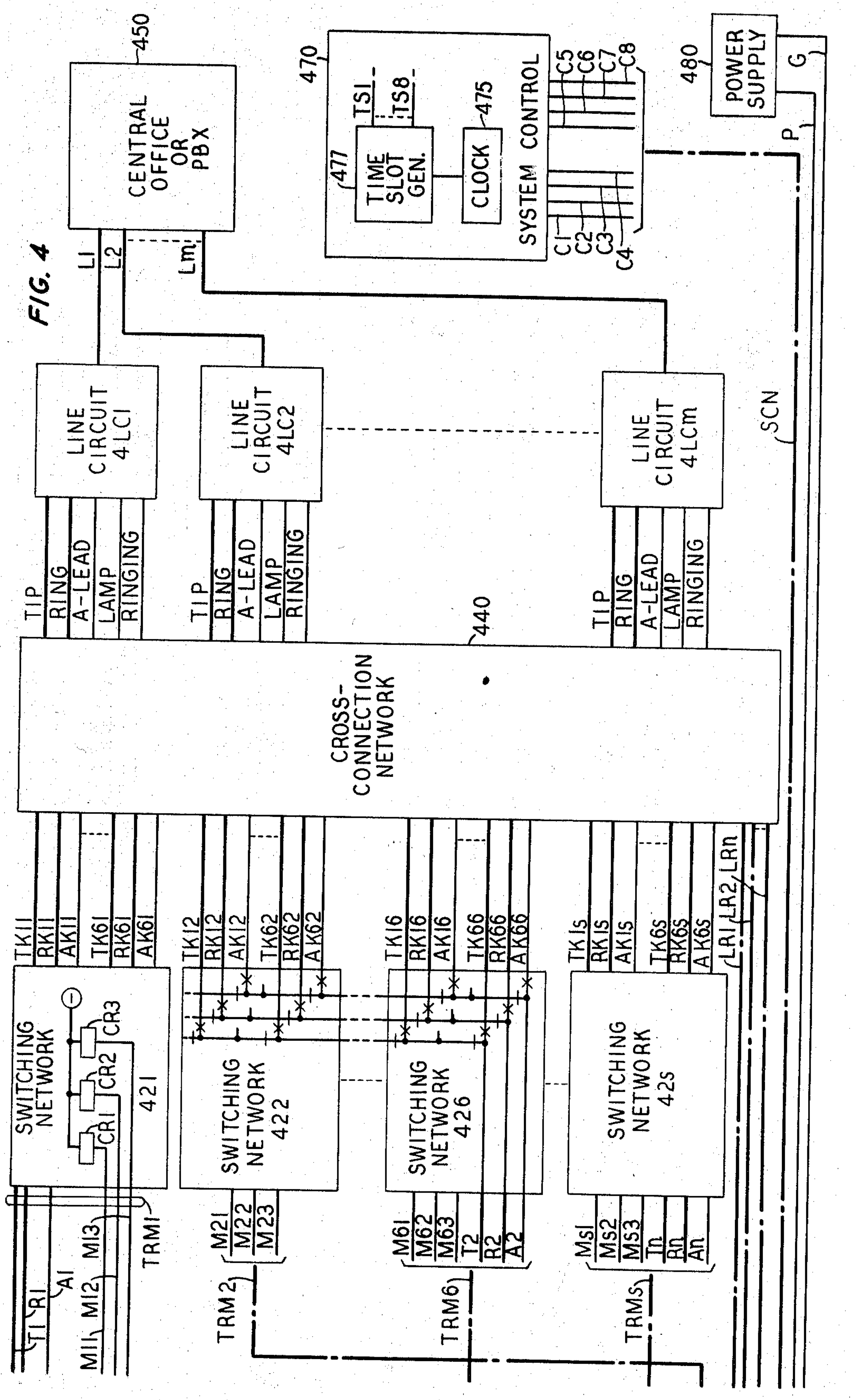
Figure 5:
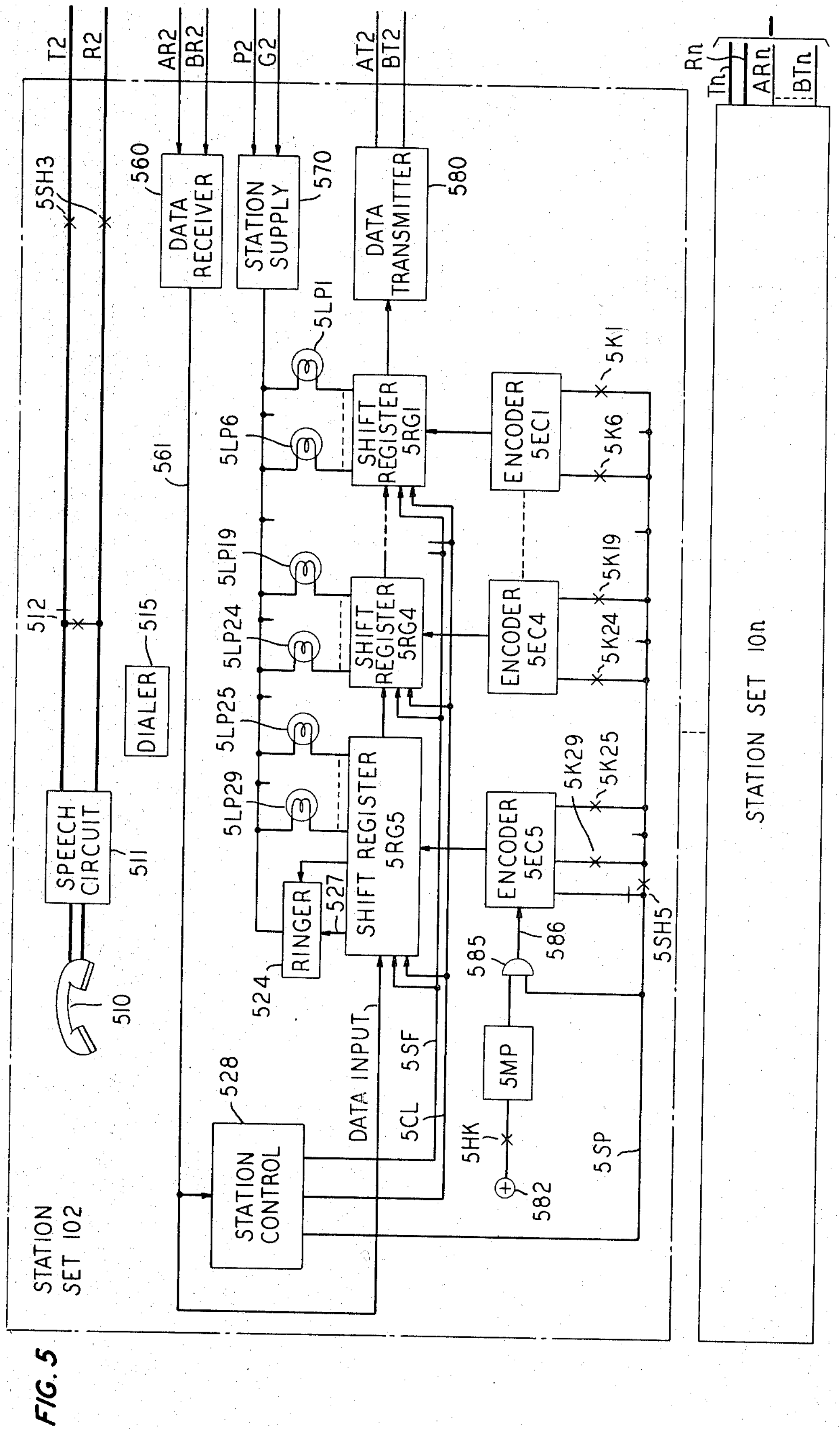

Each station set in the key telephone system, it will be recalled, is connected over a respective talking path to a switching network, depicted in modular form as respective switching networks 421 through 42*s* in FIG. 4. The individual talking path for each station set in FIGS. 2 through 6 illustratively includes a single pair of tip and ring conductors, such as conductors T1 and R1 for set 101, regardless of the number of line appearances at the station set. The tip and ring conductors T1 and R1 terminate at station set 101 in a conventional speech circuit 211 and handset 210. As shown in FIG. 2, tip and ring conductors T1 and R1 also include dial switch 212 and a pair of switch hook contacts 2SH3. Switch hook contacts 2SH3 are normally open, indicative of an on-hook condition, and contacts 2SH3 close in conventional fashion when handset 210 is lifted from its cradle to go off-hook. Dial switch 212 is a transfer contact pair which operate repetitively in a conventional fashion during dialing operation by dialer 215, assumed herein to be a rotary dial for the purposes of illustration.

Station set 101 further comprises a plurality of keys 2K1 through 2K5 and 2HK, depicted as individual make contacts in FIG. 2. Each key 2K1 through 2K5 and 2HK represents a separate subscriber service feature available at station set 101, such as multiple line selection and hold. For example, it will be assumed herein for the purposes of description that keys 2K1 through 2K5 individually provide for the selection of predetermined ones of telephone lines L1 through L*m* on which calls can be initiated or received at station set 101. Further, keys 2K1 through 2K5 are assumed herein to be of the locking type for the purposes of description. Key 2HK is assumed to be nonlocking and provides for the usual service feature of holding one line while another line is seized for use. Monopulser 2MP generates a pulse when hold key 2HK is operated, the pulse being of sufficient duration to insure that a manifestation of the hold signal persists until it is transmitted to common control during the next scan. Additional buttons or keys may be provided at station set 101, such as keys 2F1 through 2F*k*, if desired, for other service features such as exclusion, intercom, or the like.

In the audio and visual signaling portion of station set 101, an audible tone ringer 224 is provided along with lamps 2LP1 through 2LP5. Ringer 224 may, if desired, comprise circuitry for generating several distinct audio signals, responsive to particular combinations of input signals on leads 271 and 272. It will be assumed herein that normal ringing indicative of an incoming call is generated by ringer 224 in response to an input signal on lead 271. Lamps 2LP1 through 2LP5 are respectively associated with line selection keys 2K1 through 2K5 and thus individually correspond to the predetermined ones of lines L1 through L*m* appearing at, and accessible to, station set 101. Control of lamps 2LP1 through 2LP5 and ringer 224 is effected via shift register 220 in the manner described in detail below.

Figure 6:
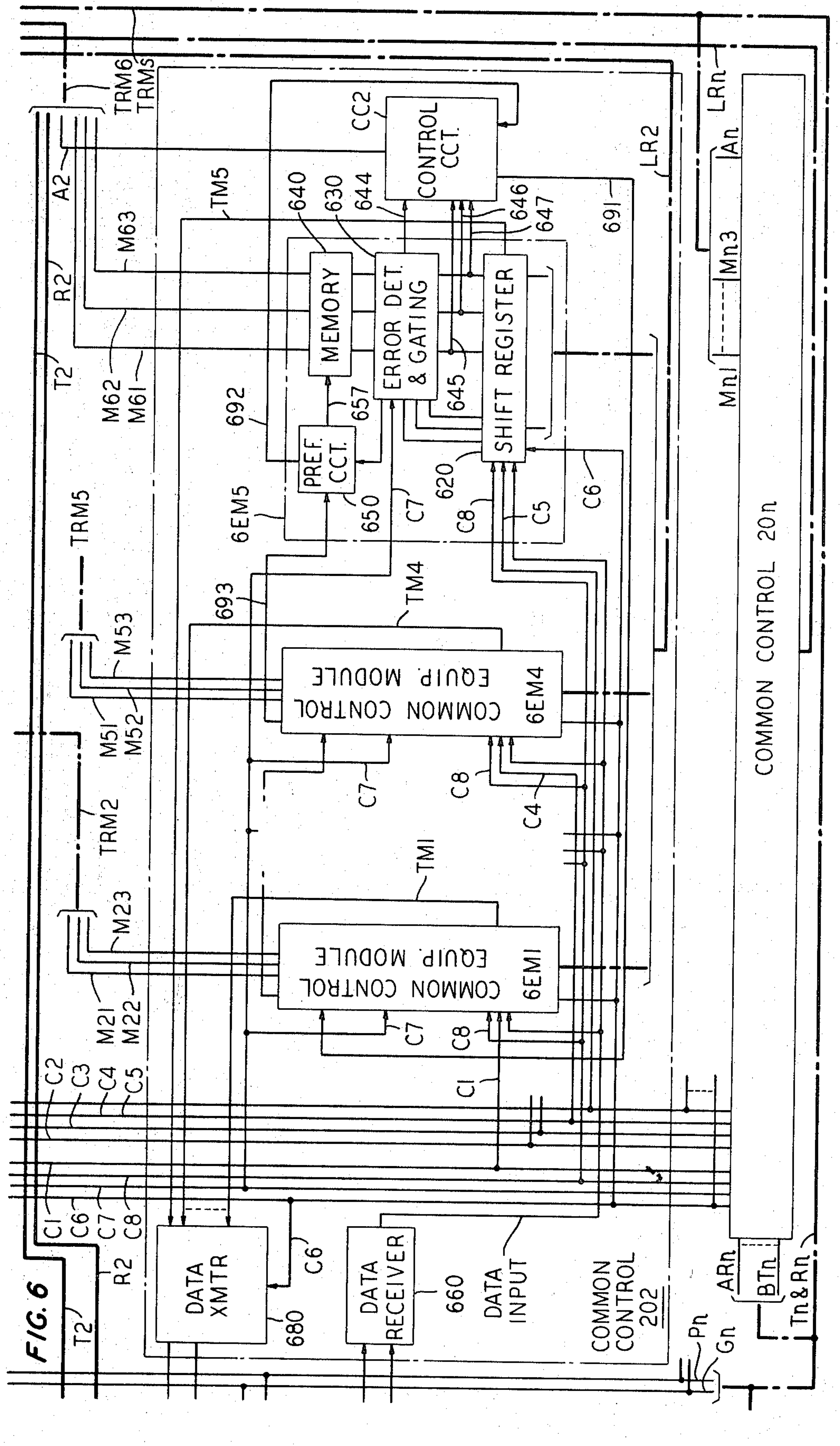

Station sets 101 through 10*n* are each connected to common control, depicted in modular form as respective common control 201 through 20*n* in FIGS. 3 and 6, over respective control signal channels for the transmission of supervisory and control information between the individual station sets and common control on a time division basis. In particular, each control signal channel includes a pair of data receive leads for transmission of information from common control to the individual station sets, a pair of power supply leads, and a pair of data transmit leads for transmission of station control signal information from the station sets to common control. Thus, station set 101 is connected to common control 201 in FIG. 3 by data receive leads AR1 and BR1, by data transmit leads AT1 and BT1, and by power supply leads P1 and G1.

It will be appreciated that the number of line appearances at an individual station set in a key telephone system can vary from one line appearance up to perhaps the number of total lines L1 through L*m* available. To obviate the necessity for providing different circuit realizations for different sized station sets, each station is defined advantageously herein as a fixed group of line appearances or keys, such as six keys, and a respective module of equipment is provided therefore at the station set and at the common control. If a station set in the system has more than six line appearances associated therewith, additional station set equipment modules and common control equipment modules are provided for each additional group of six or less line appearance keys. Thus, by way of example, station set 102 in FIG. 5 having 29 line appearance keys 5K1 through 5K29 and hold key 5HK is provided with a total of five station set equipment modules and five common control equipment modules.

Each station set equipment module includes a seven-bit shift register and an encoder, such as shift register 220 and encoder 230 at station set 101 in FIG. 2. Encoder 230 comprises known encoding circuitry, such as a diode matrix network, for generating predetermined seven-bit codes on output leads 231 through 237 corresponding to input station control signals on individual ones of input leads 286, 240 through 245, and 251 through 25*k*. In addition, each station set includes a data receiver, such as data receiver 260 connected to the station data receive leads, a data transmitter such as data transmitter 280 connected to the station data transmit leads, and a station supply such as station supply 270 connected to the station power supply leads. Data transmitter 280 and data receiver 260 comprise, for example, pulse transformers for transmitting and receiving information in the form of pulses over transmit leads AT1 and BT1 and receive leads AR1 and BR1. Station supply 270 includes a voltage regulator to compensate for voltage drops in the power supply leads P1 and G1 from common control and generates the lamp supply and circuit supply voltages for station set 101.

Station control circuitry is provided at each station set, such as station control 228 at set 101 and station control 528 at set 102. Station control at each station set is slaved to common control and is responsive to information received therefrom over the respective station data receive leads to generate clear and shift pulses for the one or more shift registers at the station set. Station control is also responsive to information received from common control during each scan cycle to generate sample signals for sampling the status of the various station keys.

As mentioned above, the station control signals transmitted from the various station sets to common control include line selection signals, hold signals, other feature signals, and switch hook information. At each scanning of a station set only a single encoded station control signal is transmitted from the station set over the data transmit leads to common control. Accordingly, for the purposes of transmission, the station control signals are given priority in the following order of descending priority: hold signals, other feature signals, on-hook information, line selection signals. Accordingly, if two different station control signals are concurrently extended to encoder 230, such as a line selection signal on one of leads 241 through 245 and a hold signal on lead 286, encoder 230, via suitable known preference gate circuitry 250 therein, responds to and encodes the higher priority signal, in this case the hold signal, for registration in shift register 220. The lower priority control signal, the line selection signal in the above example, is encoded during a subsequent scan for transmission to common control. If nonlocking line selection and feature keys are employed at the station set, monopulsers or other suitable circuitry may be provided to insure that the line selection and feature signals persist on leads 241 through 245 and 251 through 25*k* until they are encoded and registered in shift register 220.

Turning now to the common control circuitry, each common control equipment module for a six-key station includes a seven-bit register, a three-bit memory, an error detector and gating circuit, and a preference circuit. In addition, as mentioned above, a respective switching network module 421 through 42*s* is associated with each six-key station at a station set. Thus, for station set 101, common control 201 shown in FIG. 3 comprises a single common control equipment module including memory 340, shift register 320, error detector and gating circuit 330, and preference circuit 350. Switching network 421 is associated with station set 101. Similarly, for 30-key station set 102, common control 202 shown in FIG. 6 comprises five common control equipment modules 6EM1 through 6EM5, one for each group of six keys; and five substantially indentical switching networks 422 through 426 are associated with station 102.

Switching networks 421 through 42s each function to selectively connect the tip and ring pair of an associated station set to the tip and ring pair associated with an operated line selection key at the set. Thus, for example, when line selection key 2K1 at station set 101 is operated, switching network 421 functions to connect tip and ring conductors T1 and R1 to tip and ring conductors TK11 and RK11, respectively. The operation of the switching network also connects an A-lead extending from the common control and associated with the particular station set to the A-lead of the selected line. Thus, operation of key 2K1 at set 101 also connects lead A1 to lead AK11, for example. In the case of a station set having more than one six-key station, the associated switching networks are serially connected to the tip and ring conductors and A-lead of the set, thereby insuring that only one line can be connected to the station set at a time. Thus, switching networks 422 through 426 are serially connected to conductors T2 and R2 and lead A2 of station set 102.

Illustratively, switching networks 421 through 42s may comprise miniature relay tree networks, the paths therethrough being selected in known manner by the various operating combinations of control relays CR1, CR2 and CR3. Each switching network, as mentioned above, is associated with a particular six-key station and thus, with a corresponding common control equipment module, the output of the three-bit memory in the associated common control equipment module being connected to the switching network control relays. The output of memory 340 for station set 101 is thus connected over output leads M11, M12 and M13 to control relays CR1, CR2, and CR3, respectively, of switching network 421.

Cross-connection network 440 connects switching networks 421 through 42s to line circuits 4LC1 through 4LC*m*, associating each line selection key at station sets 101 through 10*n* with a particular one of lines L1 through L*m*. For example, key 2K1 at station set 101 is associated with line L2 by connecting output leads TK11, RK11 and AK11 of switching network 421 through cross-connection network 440 to the tip, ring and A-lead of line circuit 4LC2 for line L2. Similarly, key 5K19 at station set 102 is associated with line L2 by connecting the appropriate tip, ring and A-lead outputs of switching network 425 (not shown), associated with the six-key station including key 5K19, through cross-connection network 440 to line circuit 4LC2. Changes in the particular lines selected by the individual line selection keys at station sets 101 through 10*n* are effected readily at any time by simply changing the corresponding cross-connections in network 440.

The lamp and ringing leads from line circuits 4LC1 through 4LC*m* are similarly connected through cross-connection network 440 over respective lamp and ringing buses LR1 through LR*n* to shift register inputs of the appropriate common control equipment modules associated, via corresponding station set line selection keys, with the particular lines and with the station set ringers. In this manner, therefore, the lamp and ringing leads of line circuit 4LC2, for example, are connected through network 440 over bus LR1 to inputs of stages 3S3 and 3S1, respectively, of shift register 320 associated with key 2K1 and with ringer 224 at station set 101. The lamp and ringing leads of line circuit 4LC2 are also connected through network 440 over bus LR2 to the respective shift register inputs of modules 6EM4 and 6EM5 associated with key 5K19 and with ringer 524, respectively, at station set 102. It will be assumed herein that the individual ringing leads of each line appearing at a station set are connected to the shift register input associated with the station set ringer. It will be appreciated, however, that if ringing is desired on only selected lines appearing at the station set, then only the ringing leads corresponding to the selected lines are connected to the shift register input associated with the ringer.

Each common control 201 through 20*n* further comprises a data transmitter, a data receiver and a control circuit associated with each station set in the system, such as data transmitter 380, data receiver 360 and control circuit CC1 in common control 201 associated with station set 101. The data transmitter and data receivers at common control may be substantially identical to those at the station sets. The control circuits, such as control circuits CC1 and CC2, are individually connected to each switching network associated with the same station set as the particular common control. Control circuit CC1 in common control 201 is thus connected via lead A1 to a single switching network, switching network 421. Control circuit CC2 in common control 202, on the other hand, is connected via lead A2 over bus TRM6 serially to each of the five switching networks 422 through 426 associated with station set 102. The control circuits, such as control circuits CC1 and CC2, function principally, in response to certain station control signals, to generate the usual A-lead ground required for operation of the line circuits.

Figure 8:
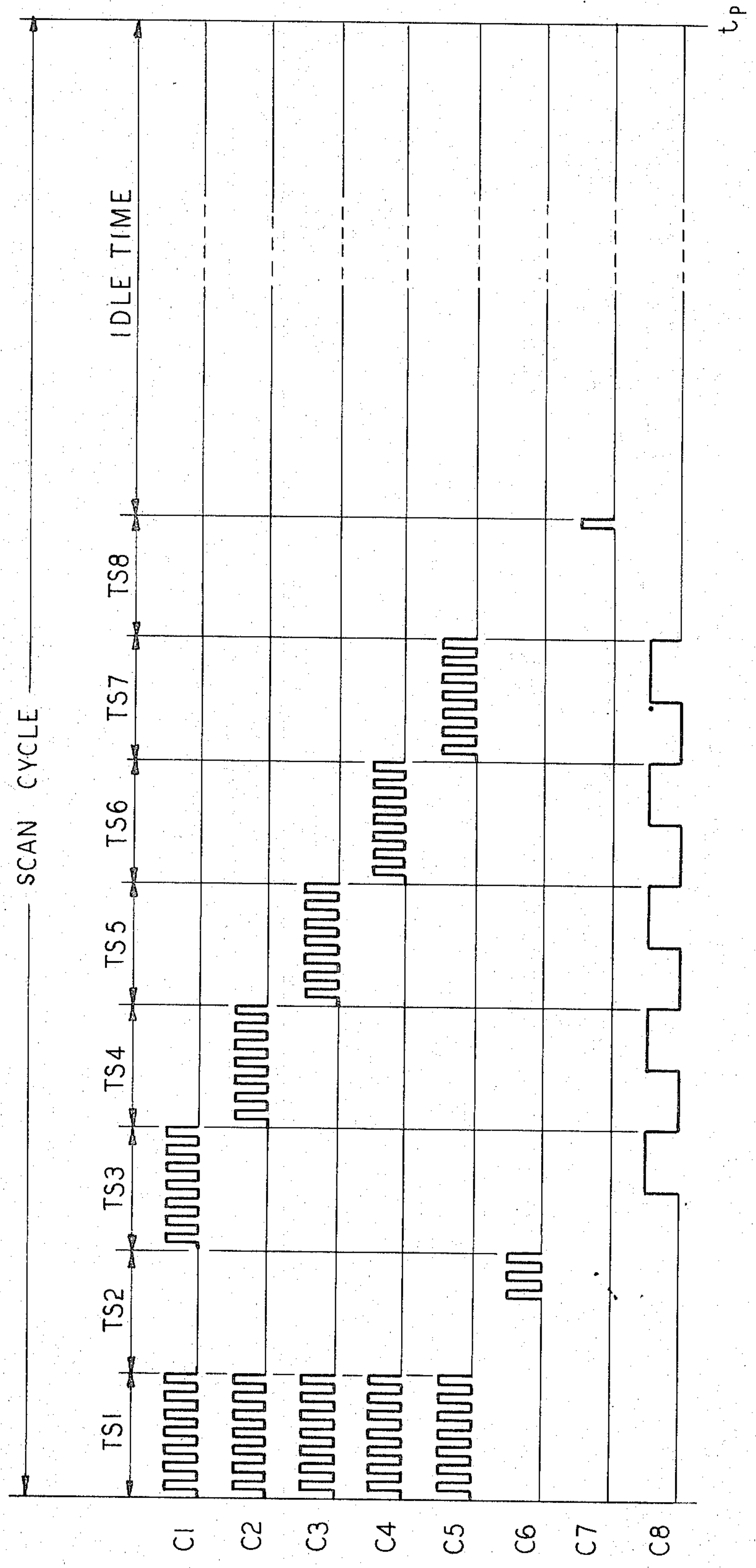
FIG. 8 shows a timing chart useful in describing the operation of the invention.

Power for the key telephone system is provided by power supply 480 and is extended to the station sets over power leads P and G. Timing information for system operation is generated by system control 470 on control leads C1 through C8. The system operating frequency is determined by clock 475 and illustratively may be on the order of 44.8 kH. It is assumed herein for the purposes of description that the system operating or scan cycle is divided into active time, comprising eight time slots of seven bits each, and idle time, the active time taking perhaps one-eighth of the scan cycle and the idle time taking the remaining seven-eighths of each cycle. This illustrative system scan cycle is depicted in FIG. 8 showing typical timing waveforms generated on control leads C1 through C8 by system control 470 during time slots TS1 through TS8.

All of station sets 101 through 10*n* are processed concurrently by common control during each scan cycle of the system. During time slot TS1 the common control shift registers are cleared in response to the timing signals on control leads C1 through C5. The lamp and ringing signals provided by line circuits 4LC1 through 4LC*m* through cross-connection network 440 over lamp and ringing buses LR1 through LR*n* are then registered in the respective common control shift registers during time slot TS2 under the control of the timing signals on control lead C6. At the same time, also under control of the signals on control lead C6, the respective station set shift registers are cleared and the encoded station control signals are registered therein. During time slots TS3 through TS7 the lamp and ringing signals in each of the common control shift registers are transmitted over the station data receive leads to the respective station sets concurrently with the transmission of the station control signals in the station set shift register over the transmit leads to the respectively associated common control shift registers. The common control memories are then updated in accordance with the new station control signals registered in the common control shift registers during time slot TS8 by the signal on control lead C7, and the system goes idle for the remainder of the scan cycle as depicted in FIG. 8. During the idle time the lamp and ringing signals remain stored in the station set shift registers to effect operation of the lamps and ringers at the several station sets. Upon termination of the idle time, at time $t_p$ in FIG. 8, the above scan cycle is repeated.

If an error occurs in the station control signals transmitted from a station set to common control, the station set may be connected to an unwanted line. Such errors are minimized in accordance with an aspect of my invention, as mentioned above, by the provision of an encoder for each six-key station at each station set which functions to generate predetermined seven-bit coded representations of the various station control signals. Suitable error detecting codes which may be employed for this purpose are well known and may be found, for example, in "Error Correcting Codes" by W. W. Peterson (M.I.T. Press 1961). Herein, it will be assumed for the purposes of description that a (7,4) binary cyclic code is employed with the generator polynomial $g(X) = 1 + x + x^3$. As the encoded station control signals are received and shifted into the respective common control shift registers, digital feedback is provided from the third stage of each shift register to the first and second stages thereof, via respective modulo-2 adders, to decode the station control signals. The digital feedback produces a linear nonsingular transformation on the incoming station control signals and generates an error check or syndrome for each such station control signal.

Illustratively, the codes assigned to the various station control signals may be arbitrarily as indicated in the following table, the error check comprising the first three bits (000) of each received code:

STATION CONTROL SIGNALS

| Condition | Code | |
|---|---|---|
| | sent | received |
| Idle | 0000000 | 0000000 |
| Line: | | |
| 1 | 1100101 | 0001001 |
| 2 | 1101000 | 0001000 |
| 3 | 1110010 | 0001010 |
| 4 | 1011100 | 0001100 |
| 5 | 1010001 | 0001101 |
| 6 | 1000110 | 0001110 |
| Hold | 0110100 | 0000100 |
| On-hook | 0111001 | 0000101 |
| Feature 1 | 0001101 | 0000001 |
| Feature k | 0100011 | 0000111 |

After an entire seven-bit encoded station control signal has been received and decoded the error check therefor is stored in the first three stages of the common control shift register, such as stages 3S1, 3S2 and 3S3 of shift register 320, and the transformed station control signal is stored in the last four stages of the shift register, such as stages 3S4 through 3S7 of shift register 320. The error check is extended to the error detector and gating circuit for the particular common control equipment module, such as error detector and gating circuit 330 in FIG. 3. If no error has occurred, i.e., the error check is "000," the transformed station control signal is analyzed by the error detector and gating circuit to determine if the signal transmitted from the station set was a line selection signal or another station control signal. If a line selection signal was sent, a binary "1" appears in the fourth stage of the common control shift register; and the selected line identity, which appears in the last three stages of the shift register, is gated to the associated memory. If an on-hook, hold or other feature signal was sent from the station set a binary "O" appears in the fourth stage of the shift register, and the contents of the last three stages of the shift register are directed to the control circuit for the particular station set to initiate the appropriate action, such as disconnect of the set or connection of the set to a hold bridge.

As mentioned above, each common control equipment module includes a preference circuit. The preference circuits function to effect registration of disconnect codes in the associated memories, and they serve principally as the signaling links between the several equipment modules in a particular common control. As such, the preference circuits assign priorities to the several six-key stations at a station set such as station set 102. Each preference circuit includes an OR gate and an AND gate, such as gates 353 and 355 in preference circuit 350. If an error-free line selection code is received in a common control shift register, the error detector and gating circuit provides a signal to the associated preference circuit, which is extended through the OR gate to the next higher priority preference circuit. If such a signal is received from a lower priority preference circuit, and an error-free line selection code has not been registered in the shift register in the particular module, the preference circuit AND gate is enabled to extend the lower priority preference circuit signal therethrough to the associated memory, effecting registration of a disconnect code in the memory. The incoming signal from the lower priority preference circuit is also extended through the OR gate to the next higher priority preference circuit. In this manner a disconnect code is stored in each memory except the memory associated with the highest priority six-key station from which a line selection code is received at a common control.

The input to the lowest priority preference circuit and the output of the highest priority preference circuit are connected to the control circuit in the particular common control. Thus, a disconnect code can also be stored in each memory by a signal from the control circuit, such as when the particular station set goes on-hook. For example, registration of the disconnect code in memory 340 is effected by a signal from control circuit CC1 on lead 391, which is extended through gate 355 over lead 357 to memory 340. Gate 355 is enabled by the absence of a line selection code in shift register 320.

With the above description in mind, consider now the operation of the illustrative key telephone system embodiment of FIGS. 2 through 6, assuming an incoming call from central office or PBX 450 on line L1, by way of example. Assume that line L1 appears at station sets 101 and 102 and that it is selected by key 2K4 at set 101 and by key 5K25 at set 102. Assume further that initially station sets 101 and 102 are idle and on-hook. The incoming call on line L1 is detected by line circuit 4LC1 in the usual manner to provide the typical flashing lamp and ringing signals on the lamp and ringing output leads to cross-connection network 440. The lamp and ringing signals are extended by network 440 over particular ones of lamp and ringing buses LR1 through LR*n* to the appropriate inputs of the various common control shift registers associated with the stations at which line L1 appears. During time slot TS2 of the next scan cycle the common control shift registers are each enabled by the timing signals on control lead C6 from system control 470 to register the lamp and ringing signals appearing on buses LR1 through LR*n*. Thus the ringing signal for line L1 from line circuit 4LC1 appears on buses LR1 and LR2 and is registered in the common control shift register stages associated with ringers 224 and 524 at station sets 101 and 102; that is, in the first stage 3S1 of shift register 320 for set 101 and in the first stage of shift register 620 in common control equipment module 6EM5 for set 102. The lamp signal for line L1 on buses LR1 and LR2 is registered in stage 3S6 of shift register 320 and in the last stage of shift register 620 in common control equipment module 6EM5, the particular common control shift register stages associated with key 2K4 at set 101 and key 5K25 at set 102, respectively.

During time slot TS3, the seven-bit timing signals from system control 470 on control lead C1 enable gates 323 and 325 and shift the contents of shift register 320 out serially over leads 381 and 382 to data transmitter 380. The lamp and ringing information is therefore transmitted serially by data transmitter 380 over data receive leads AR1 and BR1 to data receiver 260 at station set 101. Data receiver 260 directs the received lamp and ringing information over path 261 to station control 228 and to the data input of shift register 220. Station control 228 is responsive thereto to generate shift pulses on lead 2SF, thereby registering the lamp and ringing information on path 261 in shift register 220. The ringing signal is registered in stage 2SR1 of shift register 220 and the lamp signal is registered in stage 2SR6. The consequent outputs of shift register 220 on leads 271 and 276 respectively energize ringer 224 and light lamp 2LP4 associated with key 2K4.

Similarly, during time slot TS7 the seven-bit timing signals on control lead C5 shift the lamp and ringing information out of common control equipment module 6EM5 over path TM5 to data transmitter 680. The lamp and ringing information is transmitted by data transmitter 680 over data receive leads AR2 and BR2 to data receiver 560 at station set 102, which directs the received information over path 561 to station control 528 and to the data input of shift register 5RG5. Station control 528 is responsive thereto to generate shift pulses on lead 5SF, registering the lamp and ringing information in shift register 5RG5. The ringing signal is registered in the first stage of shift register 5RG5 and energizes ringer 524 over lead 527. The lamp signal for line L1 is registered in the last stage of shift register 5RG5, lighting lamp 5LP25 associated with key 5K25.

Other of station sets 101 through 10*n* having line L1 appearing thereat receive the lamp and ringing information in a similar manner during time slots TS3 through TS7, energizing the ringer and lighting the lamp associated with the line L1 selection key at each such station set. In subsequent scan cycles, the lamp and ringing information for line L1 is repeatedly sampled at common control in the above manner and transmitted to the station sets at which line L1 appears until the incoming call is discontinued, terminating the lamp and ringing signals provided by line circuit 4LC1, or until the call is answered by one of the station sets.

Assume, for example, that station set 101 goes off-hook and operates key 2K4 to answer the incoming call. During time slot TS1 of the succeeding scan cycle, the timing signal on lead C1 clears shift register 320 at common control. The timing signals on lead C6 during time slot TS2 are extended by data transmitter 380 to station set 101. The first of the three timing signals received during time slot TS2 enables station control 228 to respond to the second timing signal to generate a clear signal on lead 2CL, clearing shift register 220 at set 101. At the same time, when the third timing signal on lead C6 is received at set 101, station control 228 is responsive thereto to provide a sample signal on lead 2SP. The sample signal on lead 2SP is extended through the make portion of switch hook contact 2SH5 (operated by the off-hook condition of set 101) and through operated line selection key 2K4 to encoder 230. Encoder 230 generates the particular line selection code representation for key 2K4, illustratively "1011100" from the above table, and extends the encoded station control signal in parallel over leads 231 through 237 to shift register 220. At the same time, the timing signals on lead C6 during time slot TS2 effect registration of the lamp and ringing information on bus LR1 from line circuit 4LC1 in shift register 320 in the manner described above.

During time slot TS3 the seven-bit timing signals from system control 470 on lead C1 enable gates 323 and 325 and shift the contents of shift register 320 out over leads AR1 and BR1 to station set 101, in the manner described, for registration in shift register 220. Concurrently, the encoded station control signal in shift register 220 is serially shifted out to data transmitter 280 for transmission over leads AT1 and BT1 to data receiver 360 at common control 201. As the incoming encoded station control signal received by data receiver 360 is shifted into shift register 320, it is decoded and an error check is generated. For this purpose the output of stage 3S3 of shift register 320 is extended through gate 322, enabled by the timing signal on lead C8 during the last four bits of the incoming station control signal, to modulo-2 adders 327 and 328. The third bit of register 320 is thus modulo-2 added to the inputs of stages 3S1 and 3S2 of shift register 320. At the end of time slot TS3, the decoded station control signal is registered in stages 3S4 through 3S7 and the error check therefore is registered in stages 3S1 through 3S3 of shift register 320.

The error check is extended by stages 3S1, 3S2 and 3S3 over leads 331, 332 and 333 to gate 370 in error detector and gating circuit 330. If no detectable error is present in the received station control signal, the error check registered in stages 3S1 through 3S3 is "000" and a signal thus appears on each of leads 331 through 333. During time slot TS8, gate 370 is enabled by the timing signal on lead C7 to extend the error check therethrough to gates 372 and 374. If no error is detected gates 372 and 374 will be enabled thereby. If an error is detected, as indicated by a binary "1" in one or more of stages 3S1 through 3S3, no signal is directed through gate 370, gates 372 and 374 remain disabled, and no further action is taken with regard to the received station control signal.

Assuming no error is detected, the received station control signal enables gates 372 and 374 to determine whether the received signal is a line selection code or a feature code. All line selection codes contain a binary "1" in the fourth bit position of the received station control signal, and all other codes contain a binary "0" in the fourth bit position. This bit is registered in stage 3S4 of shift register 320 and is extended over lead 334 to gate 372 and through inverter 373 to gate 374. If the bit is a "0," a signal is extended through enabled gate 374 over path 344 to control circuit CC1. If the bit is a "1," as in the present instance, it is extended through gate 372 to enable each of gates 375, 377 and 379. The last three bits of the received station control signal identify the particular line selected and are extended by stages 3S5, 3S6 and 3S7 over leads 335, 336 and 337, through enabled gates 375, 377 and 379, respectively, to memory 340.

Memory 340 stores the three-bit code identifying the selected line in stages 3M1 through 3M3 thereof. The stored line code is extended over memory output leads M11 through M13 to switching network 421, operating a corresponding combination of relays CR1 through CR3. Operation of relays CR1 through CR3 connects conductors T1 and R1 and lead A1 to the tip, ring and A-lead associated with the line selection key operated at station set 101. In the illustrative example being described, therefore, the code "100" is stored in memory 340 and extended to switching network 421, operating relay CR1 to connect conductors T1 and R1 and lead A1 to leads TK41, RK41 and AK41 associated with key 2K4 at set 101. Leads TK41, RK41 and AK41 are cross-connected through cross-connection network 440 to the tip, ring and A-lead, respectively, of line circuit 4LC1 for line L1.

The code registered in stages 3S5 through 3S7 of shift register 320 is also extended, via leads 335 through 337 over leads 345 through 347, to control circuit CC1. Typically, any time that station set 101 is off-hook and hold key 2HK is not operated, the usual A-lead ground signal is placed on lead A1. However, there may be certain features, such as buzzing a secretary's station set, for which A-lead ground is not required. Thus, herein control circuit CC1 provides the ground signal on lead A1 only when a line selection code is registered in stages 3S4 through 3S7 of shift register 320. When a line selection code is registered in shift register 320, the "1" bit in stage 3S4 is extended through gate 372, enabled during time slot TS8, over lead 351 to preference circuit 350. The bit on lead 351 is extended through OR gate 353 in preference circuit 350 and over lead 392 to control circuit CC1.

Accordingly, in the present illustrative example when the line selection code is registered in shift register 320, control circuit CC1 receives a "1" bit on lead 392 and provides a ground signal on lead A1 which is extended through switching network 421 over lead AK41, through cross-connection network 440, to the A-lead of line circuit 4LC1. The A-lead ground signal is detected by line circuit 4LC1 to terminate the ringing signal on the ringing lead and to change the flashing lamp signal on the lamp lead to a steady lamp signal.

At this point, then, station set 101 is connected to line L1 to answer the incoming call. During time slot TS2 of the next and succeeding scan cycles, the steady lamp signal from line circuit 4LC1 is directed through cross-connection network 440 over lamp and ringing bus LR1 to stage 3S4 of shift register 320. During time slot TS3 of succeeding scan cycles the lamp signal is shifted out to shift register 220 at station set 101 to light lamp 2LP4, and station set 101 continues to send the line selection code for key 2K4 until there is a change in status. The connection between set 101 and line L1 is maintained by the line selection code stored in memory 340. The steady lamp signal from line circuit 4LC1 is also directed through cross-connection network 440, over lamp and ringing bus LR2, to the shift register in common control equipment module 6EM5 and is shifted out, during time slot TS7, to shift register 5RG5 at station set 102 to light lamp 5LP25. In a similar manner the steady lamp signal is provided to each of the other station sets at which line L1 appears.

If any other extension of line L1, such as key 5K25 at set 102, goes off-hook to answer the call, it is handled in the same manner as station set 101 above during the succeeding scan of the station sets. The line selection code for key 5K25 is transmitted to common control 202 and, if error-free, is registered in memory 640 in common control equipment module 6EM5. The line selection code is extended over leads M61, M62 and M63, via bus TRM6, to switching network 426, operating the appropriate combination of control relays therein to connect conductors T2 and R2 and lead A2 to respective leads TK16, RK16 and AK16, and thus through cross-connection network 440 to the tip, ring and A-lead, respectively, of line L1.

Assume now that both station sets 101 and 102 are off-hook and that the two sets are bridged on line L1, that is, that key 2K4 at set 101 and key 5K25 at set 102 are operated. Assume further that station set 102 decides to switch to another line appearance such as the line associated with key 5K19 which, it will be recalled, is line L2. Key 5K19 is operated effecting the release of key 5K25 via the usual mechanical interlocking apparatus. On the next scan of set 102, therefore, the sample signal generated by station control 528 on lead 5SP during time slot TS2 is extended through operated key 5K19 to encoder 5EC4, effecting registration in shift register 5RG4 of the line selection code assigned to key 5K19 (illustratively "110 0101"). This code is transmitted to common control 202 during time slot TS6 and is decoded and registered in the shift register in common control equipment module 6EM4. Since key 5K25 was released by the operation of key 5K19, during time slot TS7 an idle code is transmitted to common control 202 and registered in shift register 620 in module 6EM5. During time slot TS8 the memories in modules 6EM4 and 6EM5 are updated to reflect the new line selection.

Assuming no errors are detected, the decoded station control line selection signal is registered in the memory in module 6EM4 and is directed over leads M51, M52 and M53, via bus TRM5, to switching network 425 (not shown). In the manner described above, the line selection code registered in the shift register in module 6EM4 provides a signal through the associated preference circuit, which is directed over lead 693 to the next higher order preference circuit, that is, preference circuit 650 in module 6EM5. The signal is extended through the OR gate in preference circuit 650 over lead 692 to control circuit CC2. The signal on lead 693 is also extended through the AND gate in preference circuit 650, enabled by the absence of a line selection code in shift register 620, and over lead 657 to effect registration of the disconnect code in memory 640. The disconnect code in memory 640 is extended over leads M61, M62 and M63 to switching network 426, releasing the connection of conductors T2 and R2 and lead A2 from leads TK16, RK16 and AK16, and thus from the tip, ring and A-lead of line L1.

At the same time, the appropriate combination of control relays in switching network 425 is operated by the line selection code from module 6EM4 to connect conductors T2 and R2 and lead A2 through cross-connection network 440 to the tip, ring and A-lead of line circuit 4LC2 for line L2.

Responsive to the signal from preference circuit CC2 on lead 692, control circuit CC2 extends ground over lead A2 and bus TRM5, through switching network 425 and cross-connection network 440, to the A-lead of line circuit 4LC2. The A-lead ground is detected and a steady lamp signal is returned on the line circuit lamp lead. The steady lamp signal is directed through cross-connection network 440 and over the appropriate ones of lamp and ringing buses LR1 through LR$n$ to the common control for each station set at which line L2 appears. The steady lamp signal is thus transmitted to each of these station sets in the manner described above, lighting the respective lamp thereat associated with the line selection key for line L2, such as lamp 5LP19 at set 102 and lamp 2K1 at set 101. From this point, station set 102 is connected over line L2 to central office or PBX 450 to originate or answer a call on line L2 in the conventional manner.

Assume now that station set 102 wishes to place the call over line L2 on HOLD. Depressing nonlocking hold key 5HK at set 102 energizes monopulser 5MP via potential source 582, thereby directing a hold signal to gate 585. Gate 585 is enabled by the sample signal on lead 5SP during time slot TS2 of the next scan cycle to extend the hold signal therethrough over lead 586 to encoder 5EC5. The hold signal on lead 586 is given preference over any other station control signals directed to encoder 5EC5 and is encoded and registered in shift register 5RG5.

During time slot TS7 of the scan cycle the encoded hold signal is transmitted to common control 202 where it is decoded and registered in shift register 620 in common control equipment module 6EM5. Since the fourth bit of the decoded hold signal is a "0" the hold code is not extended through error detector and gating circuit 630 to memory 640 but is only directed to control circuit CC2. The "0" fourth bit is directed by error detector and gating circuit 630 over lead 644 to control circuit CC2, indicating that the code directed to control circuit CC2 from shift register 620 on leads 645 through 647 is a feature signal. Control circuit CC2 is responsive to the absence of a signal on lead 692, indicative of the absence of a line selection code in modules 6EM1 through 6EM5, to remove the ground signal from lead A2 to line circuit 4LC2. Line circuit 4LC2 responds in the usual manner to the removal of ground from the A-lead, with the tip and ring conductors remaining connected to the station set, to establish the desired holding bridge connection to line L2. The tip and ring conductors are still connected at this point since the line selection code for key 5K19 is stored in the memory in common control equipment module 6EM4, operating the corresponding switching network.

Release of hold key 5HK releases key 5K19 via the conventional mechanical interlocking apparatus. Thus, during the next scan cycle after termination of the hold signal from monopulser 5MP, the idle off-hook state of station set 102, with no line selection or feature keys operated, results in all binary zeros appearing in shift registers 5RG1 through 5RG5. During time slots TS3 through TS7, therefore, the idle code ("0000") is registered in each of the respective common control shift registers in common control 202. Control circuit CC2, responsive to the idle code registered in shift register 620, provides a signal on lead 591 to the preference circuits. The signal on lead 591 thus registers the disconnect code (illustratively "111") in the memories in each of common control equipment modules 6EM1 through 6EM5. The disconnect code thus registered in module 6EM4 replaces the line selection code for key 5K19 and energizes all three of the control relays in switching network 425 (not shown). When all three control relays in switching network 425 are energized in this manner, conductors T2 and R2 are disconnected from all output tip and ring leads of switching network 425.

When station set 102 subsequently removes line L2 from HOLD by operating key 5K19 again, the encoded station control signal for key 5K19 is transmitted to common control 202 during the next scan cycle and is registered in the shift register in module 6EM4. If no error is detected the particular line selection code is extended through the error detector and gating circuit to the memory in module 6EM4. The line selection code in the memory in module 6EM4, therefore, operates the corresponding combination of control relays in switching network 425, again connecting conductors T2 and R2 and lead A2 through cross-connection network 440 to line circuit 4LC2. The line selection code registered in module 6EM4 also provides a signal through the preference circuit chain in the usual manner to control circuit CC2, which accordingly provides a ground signal on lead A2. Return of the ground signal on the A-lead over line circuit 4LC1 effects disconnection of the hold bridge from line L1.

Assume now that station set 101 goes on-hook to terminate the call on line L1. When set 101 goes on-hook, switch hook contacts 2SH3 and 2SH5 release. The sample signal on lead 2SP during time slot TS2 of the next scan cycle is directed through the break portion of contact 2SH5 over lead 240 to encoder 230. Encoder 230 generates an encoded on-hook station control signal (illustratively "0111001"), which is registered in shift register 220 and thereafter transmitted to common control 202 during time slot TS3. At common control 201, the on-hook signal is decoded and directed over leads 344 through 347 to control circuit CC1. Control circuit CC1 terminates the ground on lead A1. Line circuit 4LC1 detects the removal of ground on the A-lead, coincident with the on-hook condition of set 101 via release of switch hook contacts 2SH3, to provide the usual disconnect indication over line L1 to central office or PBX 450.

Control circuit CC1 also provides a signal on lead 391 to preference circuit 350. The signal on lead 391 is extended through gate 355, enabled by the absence of a line selection code in shift register 320, over lead 357 to memory 340. The signal on lead 357 effects registration of the disconnect code ("111") in memory 340, the output therefrom on leads M11, M12 and M13 energizing control relays CR1, CR2 and CR3 in switching network 421. Conductors T1 and R1 and lead A1 for station set 101 are therefore disconnected from leads TK11, RK11, and AK11. The disconnect code remains stored in memory 340 controlling switching network 421 until a subsequent line selection code is received from station set 101.

Consider now a call origination, such as station set 101 going off-hook with key 2K5 operated. For the purposes of description, let key 2K5 correspond to the appearance at set 101 of line L*m* and assume that line L*m* is idle. During time slot TS2 of the next scan cycle the sample signal generated on lead 2SP by station control 228 is extended through the make portion of switch hook contact 2SH5 and through operated key 2K5 to encoder 230. The line selection code for key 2K5 ("1010001") is consequently registered in shift register 220 by encoder 230. During time slot TS3 the line selection code is transmitted to common control 201, decoded and registered in shift register 320. The "1" bit in stage 3S4 signifies a line selection code, enabling gate 372, and during time slot TS8 the timing signal on lead C7 is extended through gates 370 and 372 to enable gates 375, 377 and 379. The particular line selection code in stages 3S5 through 3S7 of shift register 320 is thus gated to memory 340 replacing the disconnect code therein. The output of memory 340 energizes the appropriate combination of control relays CR1, CR2 and CR3 to connect conductors T1 and R1 and lead A1 through cross-connection network 440 to the corresponding tip, ring and A-lead of line circuit 4LC*m*.

The ground signal provided by control circuit CC1 on lead A1 is detected by line circuit 4LC*m* which returns a steady lamp signal over lamp and ringing bus LR1 to stage 3S7 of shift register 320. During time slot TS2 of the succeeding scan cycle the timing signal on lead C6 gates the lamp signal into stage 3S7, and during time slot TS3 the lamp signal is transmitted to station set 101 to light lamp 2LP5 in the manner described above. At this point, then, station set 101 is connected through line circuit 4LC*m* to line L*m* and lamp 2LP5 is lighted as a visual indication at set 101. Station set 101 proceeds with the outgoing call in conventional manner via the connection over line L*m* to central office or PBX 450.

It is to be understood that the above-described arrangements are but illustrative of the application of the principles of the present invention. Numerous other arrangements may be devised by those skilled in the art without departing from the spirit and the scope of the invention.

I claim:

1. In a key telephone system the combination comprising, a switching network having a plurality of input and output paths, a plurality of telephone lines respectively connected to said input paths, a plurality of telephone station sets having key fields in which said keys are representative of individual ones of said lines, lamps associated with said keys, a talking path individually connecting each of said station sets to a respective one of said output paths, control means including said switching network operative to selectively interconnect individual ones of said input paths with predetermined ones of said output paths, means for periodically scanning each of said station sets concurrently and sampling the operation of said keys thereat to operate said control means, and means for periodically directing lamp signals to said individual station sets in parallel.

2. The combination according to claim 1 wherein said scanning and sampling means and said lamp signal directing means comprise duplex transmission channel means individually interconnecting each of said station sets with said control means.

3. The combination in accordance with claim 2 wherein said control means further includes memory means for maintaining said control means operated between scanning and sampling periods.

4. The combination in accordance with claim 3 wherein each of said station sets comprises means for storing said lamp signals between directing periods and means connecting said storing means to said station set lamps.

5. The combination in accordance with claim 1 wherein each of said station sets comprises shift register means for receiving said lamp signals and for storing said lamp signals between directing periods, and wherein said scanning and sampling means includes said shift register means operative during said sampling for registering the key operation samples and for transmitting said key operation samples to said control means.

6. The combination in accordance with claim 5 wherein each of said station sets further comprises means for encoding said key operation samples for transmission to said control means.

7. A key telephone system comprising a switching network having a plurality of input and output paths, a plurality of telephone lines connected to said input paths, a plurality of telephone station sets having key fields in which said keys are representative of individual ones of said lines, a voice communication channel individually connecting each of said station sets to a respective one of said output paths, means for periodically generating and transmitting a sample signal concurrently to all of said station sets, means in each of said station sets responsive to said sample signal for generating station control signals indicative of operated ones of said keys, control means including said switching network responsive to said station control signals to selectively interconnect individual ones of said input paths to individual ones of said output paths, visual and audible signal means in each of said station sets, and means for periodically generating and transmitting in parallel to said individual station sets first signals for selectively operating said visual and audible signaling means.

8. A key telephone system in accordance with claim 7 wherein each of said station sets includes means for storing said first signals to operate said visual and audible signaling means between transmitting periods.

9. A key telephone system in accordance with claim 8 wherein each of said station sets further includes means responsive to said sample signal for clearing said storing means and for temporarily storing said station control signals in said storing means.

10, A key telephone system in accordance with claim 9 further comprising means including said storing means at said station sets operative to transmit said station control signals to said control means substantially concurrently with the transmission to said station sets of said first signals.

11. A key telephone system in accordance with claim 10 wherein each of said station sets further includes means for encoding said station control signals prior to transmission thereof to said control means.

12. A key telephone system in accordance with claim 11 wherein said means for transmitting said first signals and said means for transmitting said station control signals comprise duplex transmission channel means individually connecting each of said station sets to said control means.

13. A key telephone system in accordance with claim 12 wherein said control means further includes memory means for maintaining said input and output paths selectively interconnected.

14. A key telephone system in accordance with claim 13 wherein said control means further includes means for selectively disconnecting interconnected ones of said input and output paths.

15. A key telephone system station set comprising a voice communication channel, a key field in which said keys are representative of individual telephone lines, means operative for providing station control signal representations of the operation of individual ones of said keys, a shift register for registering said station control signal representations, duplex transmission channel means including a receive signal channel connected to the input of said shift register and a transmit signal channel connected to the output of said shift register, and control means for operating said shift register, such that station control signal representations registered in said shift register are provided to said transmit signal channel substantially concurrently with the receipt of incoming control signals on said receive signal channel for registration in said shift register.

16. A key telephone system station set in accordance with claim 15 further comprising audible and visual signaling means connected to said shift register, said audible and visual signaling means being operated in accordance with said incoming control signals registered in said shift register.

17. A key telephone system station set in accordance with claim 16 wherein said control means further comprises means responsive to a predetermined signal on said receive signal channel for clearing said shift register and for thereafter registering said station control signal representations in said shift register.

18. A key telephone system station set in accordance with claim 17 further comprising means for encoding said station control signal representations prior to registration thereof in said shift register.